United States Patent [19]

Campbell

[11] Patent Number: 4,638,299
[45] Date of Patent: Jan. 20, 1987

[54] ELECTRICAL APPLIANCE CONTROL
[75] Inventor: David C. Campbell, Fife, Scotland
[73] Assignee: Pico Electronics Limited, Fife, Scotland
[21] Appl. No.: 479,397
[22] Filed: Mar. 28, 1983
[30] Foreign Application Priority Data Apr. 6, 1982 [GB] United Kingdom ............... 8210198

[51] Int. Cl.$^4$ .......................................... H04M 11/04
[52] U.S. Cl. ..................................... 340/310 A; 375/3
[58] Field of Search .............. 340/310 A, 310 R, 291, 340/825.57, 825.07; 375/3, 4

[56] References Cited

U.S. PATENT DOCUMENTS

| 3,564,433 | 8/1969 | Miller | 375/3 |
| 4,156,866 | 5/1979 | Miller | 340/825.5 |
| 4,357,598 | 11/1982 | Melvin, Jr. | 375/4 |
| 4,369,523 | 1/1983 | Seki et al. | 375/3 |
| 4,412,335 | 10/1983 | Froment et al. | 375/3 |
| 4,467,314 | 8/1984 | Weikel et al. | 340/310 A |

FOREIGN PATENT DOCUMENTS 2107095A 3/1983 United Kingdom ........... 340/310 A

OTHER PUBLICATIONS

Hoshino et al, "Centralized Load Control and Automatic Meter Reading System", Nov. 1977, all.

Primary Examiner—Douglas W. Olms
Assistant Examiner—Curtis Kuntz
Attorney, Agent, or Firm—Pollock, Vande Sande & Priddy

[57] ABSTRACT

An electrical appliance remote control system comprises a transmitter supplying digital control messages onto a power main and a receiver for receiving those messages to activate an appliances accordingly. Each message comprises words each of which is transmitted twice. A repeater is coupled to the main to receive the first occurrence of the word and to retransmit that word onto the main, or onto another main, in the period containing the second occurrence of the word.

10 Claims, 14 Drawing Figures

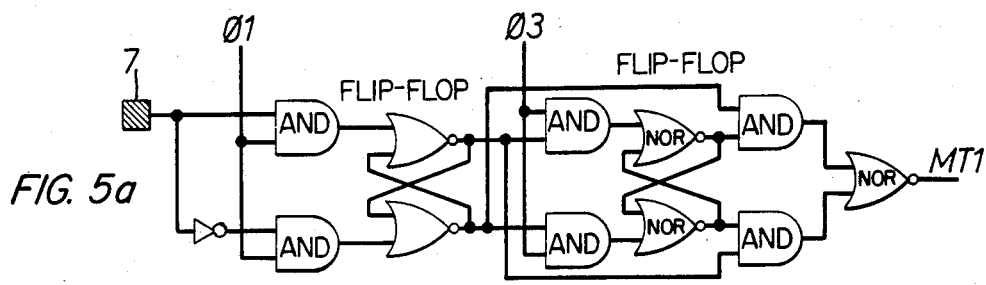
FIG. 5a
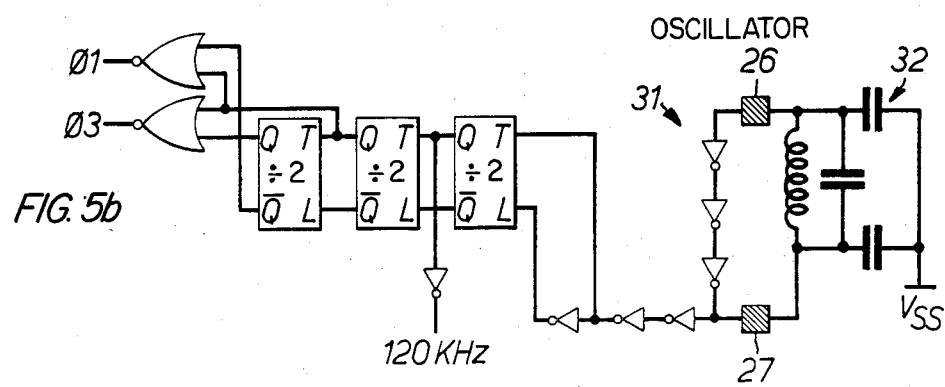
FIG. 5b
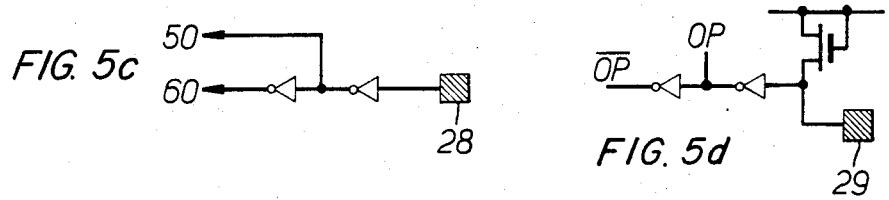
FIG. 5c   FIG. 5d
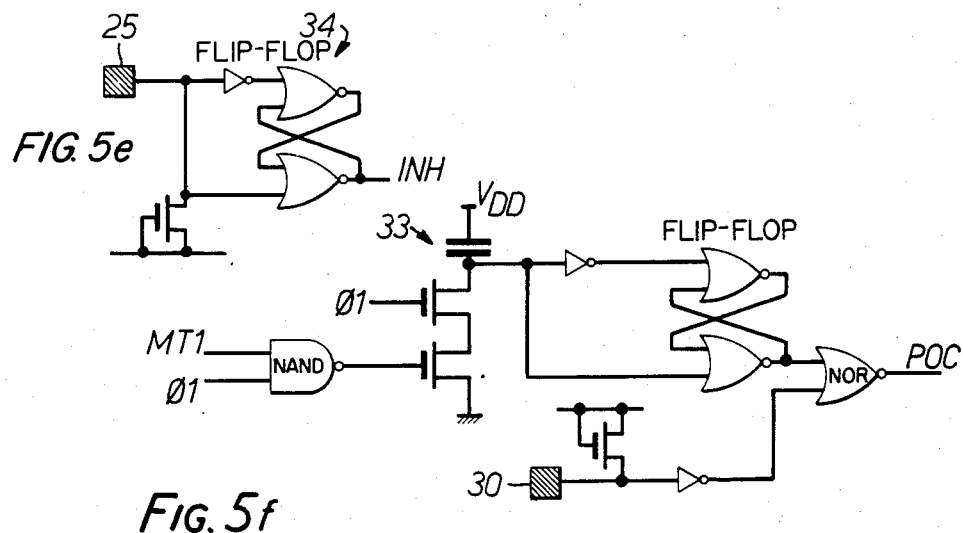
FIG. 5e
FIG. 5f

ELECTRICAL APPLIANCE CONTROL

BACKGROUND OF THE INVENTION

This invention relates to electrical appliance control and particularly concerns remote appliance control effected by way of digital control signals transmitted on a power main.

U.K. Pat. No. 1592971 discloses such a remote control system for electrical appliances in which receivers control the supply of power to the appliances, the receivers themselves being controlled by digital instruction signals conveyed by the power main. The instruction signals, generated by a transmitter coupled to the main, may include, in some cases, an address to identify a particular receiver to be controlled.

Preferably, each instruction or message comprises a plurality of binary bits transmitted during selected time slots relative to the zero-crossing points of the main. Specifically one set of transmission time slots occurs close to the zero-crossing points of one phase of the main. In order that the instruction or message may be coupled to other phases of the main, other sets of transmission time slots are provided close to the zerocrossing points of the other phase or phases of the main. By "close" to a zero-crossing point, we mean that at least a portion of a time slot is within one eighth (preferably one tenth) of one half cycle from a zero crossing.

In the above-mentioned Patent, each bit is transmitted as the presence or absence of a high frequency (e.g. 120 KHZ) signal during the time slot. Moreover, the bits of the message are transmitted during alternate half-cycles and the inverse of those bits is transmitted during the intermediate half-cycles. Particularly, a transmission time consists of a sequence of time intervals with sections or words of a message transmitted in alternate time intervals, the intermediate intervals being long enough (preferably equal the alternate intervals) to to contain a repetition of the word. Preferably each word is also transmitted in the intermediate time intervals so that a complete message is transmitted twice.

A number of problems can occur when using such a system to control the use of energy within buildings such as factories, offices, schools and hospitals. The most common problem is low signal level at the receivers or slaves. A typical installation might have a transmitter operating on a branch circuit of a 3-phase, 60 HZ, power distribution circuit, and it is required to address several receivers located on many branch circuits on all 3 phases throughout the building. Signal attenuation occurs due to range and to shunting of the signal by loads. However, the greatest loss is usually due to poor phase coupling. Phase coupling can be improved by the use of passive components such as capacitors, or transformers; however, the net output power of the transmitter is not increased by these methods.

Other problems arise owing to the diverse types of power distribution used in such buildings, (this applies mainly in the U.S.A.). For example, two systems in common use are:

(i) the 3 phase, 4 wire 120 V/208 V system; and
(ii) the 3 phase, 4 wire 277 V/480 V system.

System (i) is used normally where motors form a substantial part of the load. System (ii) is used mainly for fluorescent lighting.

System (i) can provide 3-phase, 120 V power between each of the transformer outputs and neutral. It will also supply 208 V A.C. for loads connected between any pair of transformer outputs. The zero voltage crossings of the 208 V connections are 30 deg. delayed from those of the respective 120 V connections, (1.38 m. secs. for a 60 HZ system).

The pulses from a transmitter located on a 120 V branch circuit would not be received by a receiver with its input circuit across one of the 208 V connections because the signal time slots would not be appropriately timed. A similar problem arises for the 277 V/480 V system. Normally in a building the 277 system would be distributed and the 120 V derived where locally required by step down transformers from one phase of the 277 V. This usually introduces a 30 deg. phase shift between the local 100 V systems and the 277 V system.

In data transmission systems, it is known to provide a repeater in series with the data transmission pattern to attempt to resolve problems of low signal level.

Moreover in a power line communication system, it is known from U.K. Specifications No. 1535834 to provide a repeater to by-pass distribution transformers at which severe signal loss can occur. Such a system uses frequency shift keying and the frequencies are changed by the repeaters. The repeaters also change the form of the signal. The system appears therefore to be inoperable in the absence of repeaters as the final receivers cannot respond to the signal as originally injected onto the main. Such a system does not therefore provide any convenient answer for an electrical appliance control system as mentioned above in connection with U.K. Pat. No. 1592971.

SUMMARY OF THE INVENTION

According to one aspect of the invention, there is provided a remote control system, for an electrical appliance comprising a power main for supplying power to the appliance, a transmitter for transmitting onto the main a digital control message for the appliance, the message comprising message words transmitted in alternate time intervals of a sequence of time intervals of which the intermediate intervals have a duration at least as long as said words, a receiver for receiving said words from the main and for controlling an appliance accordingly, and a repeater circuit coupled to the main to receive and store said message words during said alternate intervals, the repeater circuit being operable to transmit said words with increased amplitude during the intermediate time intervals.

According to a second aspect of the invention there is provided a repeater circuit suitable for a system according to the first aspect, and comprising means for coupling to a main to receive and store said message words during alternate time intervals and to transmit said words with increased amplitude during the intermediate time intervals. To minimize storage in the repeater circuit, each word is repeated during the immediately following intermediate time interval.

Such a repeater circuit can be used where and if required without disturbing the form of the message so that receivers can respond to a message whether or not repeated by the repeater circuit.

In a preferred system, the transmitter itself also repeats the words during the intermediate time intervals to provide redundancy for more reliable reception by any receiver close enough to the transmitter not to be reliant on the repeater circuit. However, the intermediate intervals could, in an alternative, contain no pertinent data. Preferably, the repeater circuit is designed to repeat the words onto more than one phase of a main to achieve improved message coupling between phases.

Thus, the circuit can be designed to receive digital data from any phase of a multi-phase system and to repeat that data at an increased level onto all phases of the same system.

Each word of a message may be composed of bits or elements transmitted in time slots having a predetermined relationship with the zero crossings of the main, e.g. preferably as already described above.

The repeater circuit may then have means for defining output time slots in which the bits or elements are repeated for injection onto the phases of a power main.

In one case, the defining means is coupled to be responsive to the input power mains to define said output time slots relative to the zero crossings of the phases of that main, so that the repeated message is suitable for injection back onto that main or onto a main synchronized with the input main.

The circuit could be designed to have two modes, in one of which it operates to repeat onto the phases of the same main and in the other of which it repeats the data at an increased level onto all phases of another power system, which may be electrically isolated and asynchronous with the first system, because the output time slots are then defined relative to the mains coupled to the output means of the circuit.

A further feature of the preferred embodiment is that it is not required to be inserted in series with the data path and is not unidirectional. Thus the circuit may be coupled directly across the conductors of a power main without severing those conductors and will repeat or relay digital control signals in both directions along a main regardless of the direction of receipt.

BRIEF DESCRIPTION OF THE DRAWINGS

For a better understanding of the invention and to show how the same may be carried into effect, reference will now be made, by way of example, to the accompanying drawings, in which:

FIGS. 5 and 6 show some various input, output and control elements of the repeater circuit of FIG. 4.

DESCRIPTION OF PREFERRED EMBODIMENTS

Figure 1:
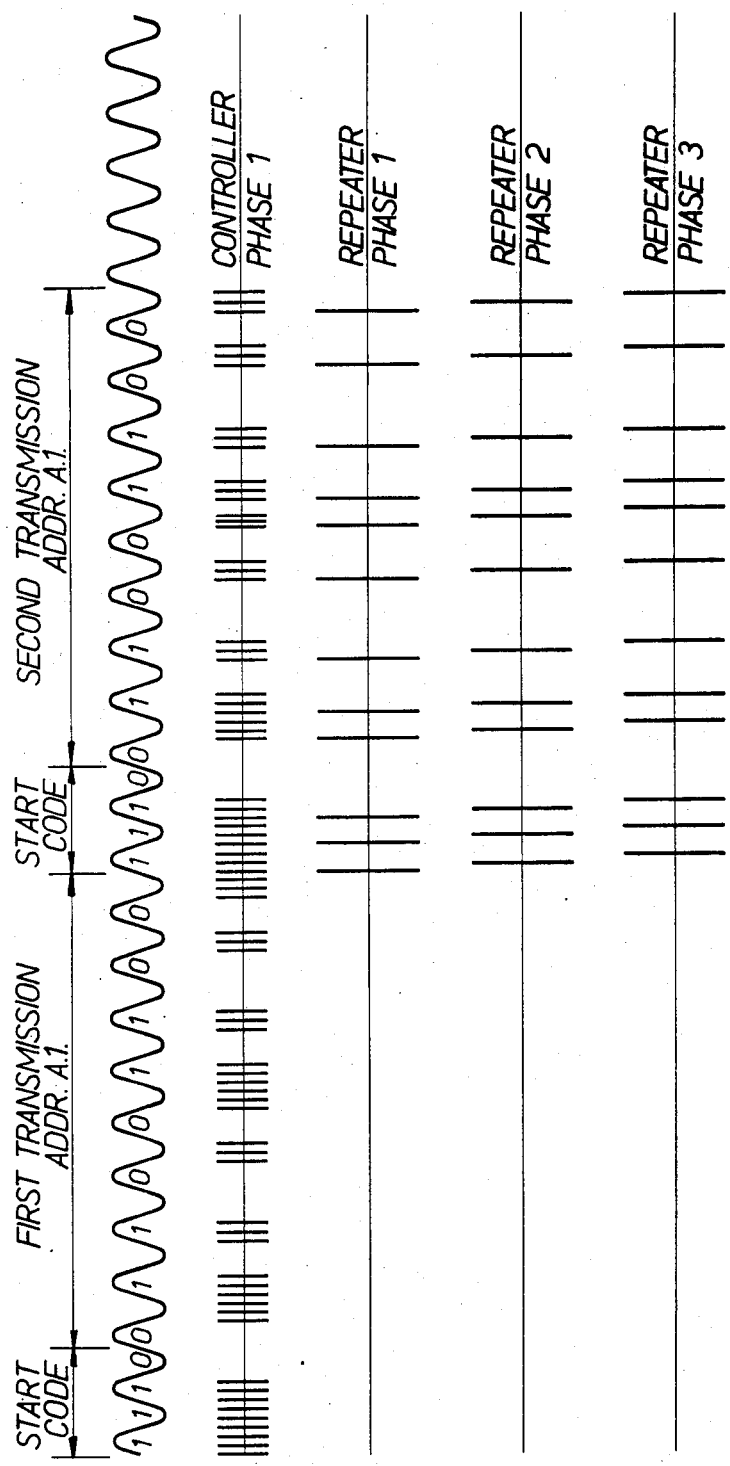
FIG. 1 is a waveform diagram showing digital data received by and transmitted from a repeater circuit.

FIG. 1 shows in its first and second lines the pattern of pulses from a transmitter on one phase of a three-phase system as described in the above-mentioned UK Pat. No. 1592971. It is assumed that a device of address A is to be switched on. Accordingly the transmitter transmits a message consisting of four digital control words, A,A,ON,ON, i.e. the address 'A' twice followed by the instruction 'ON' twice. FIG. 1 shows the address transmission A,A, consisting in fact of a four-bit start code '1110' followed by the 9-bit address value '011001100'. The start code is transmitted on successive half cycles but the address value is transmitted on alternate half cycles. Intermediate half cycles convey the inverse of the address value. The duration of one message is therefore 22 half cycles.

The second line of FIG. 1 indicates the corresponding data transmitted onto, say, phase P1. Each bit is transmitted as a burst at 120 KHZ and is repeated twice to provide a burst substantially at the zero crossing of each phase.

The repeater circuit to be described is designed to receive that signal from any one of the phases, to separate it into its three individual phases by time slot, and to emit the three signals onto respective phases (lines 3, 4 and 5 of FIG. 1) in respective time slots.

Figure 2:
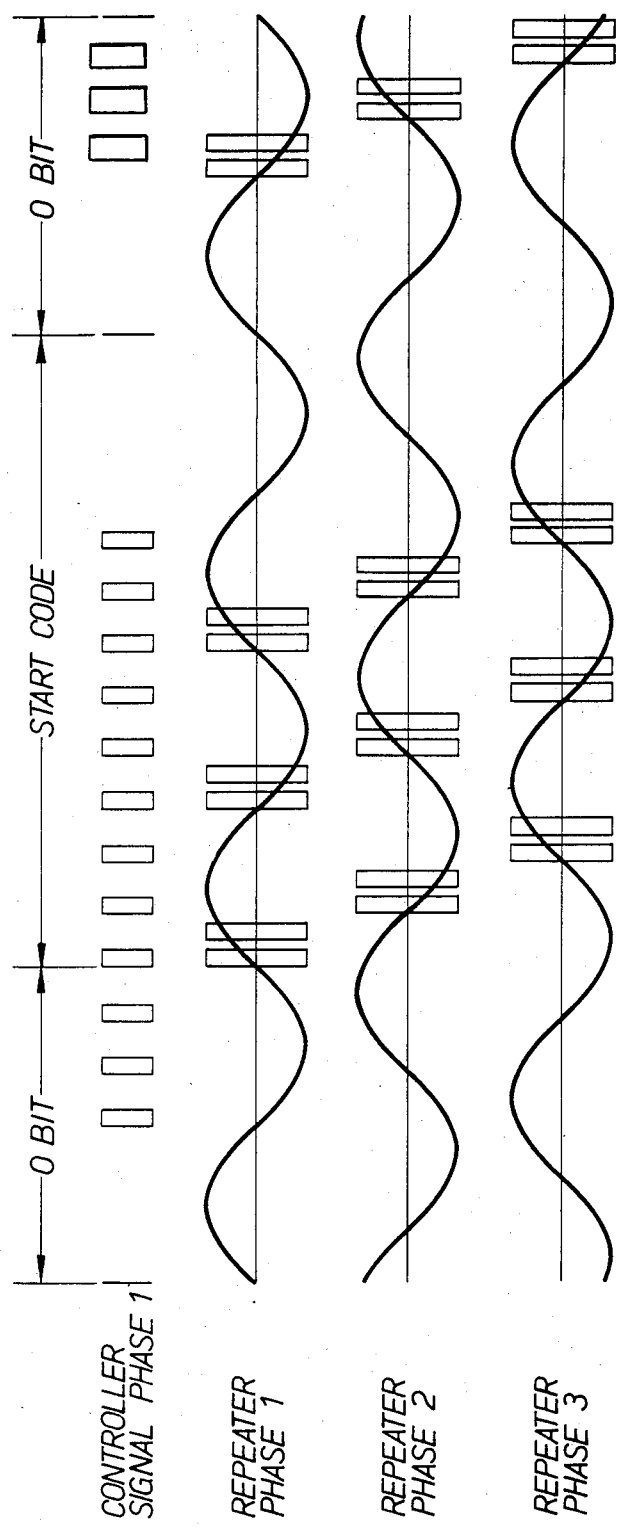
FIG. 2 shows a detail of FIG. 1.

FIG. 2 shows an expanded view of the signals in the time interval from near the end of one transmission of message 'A' to just beyond the beginning of its second transmission. The first line shows the signal received on phase P1 and the other lines show the repeated signals on phases P1, P2 and P3. In this figure a mode of operation is shown in which each phase has supplied to it not only its individual message in time slots near its own zero crossings but also that message displaced by 30° for coupling to any loads operating 30° from the individual phases, as described above.

Figure 3:
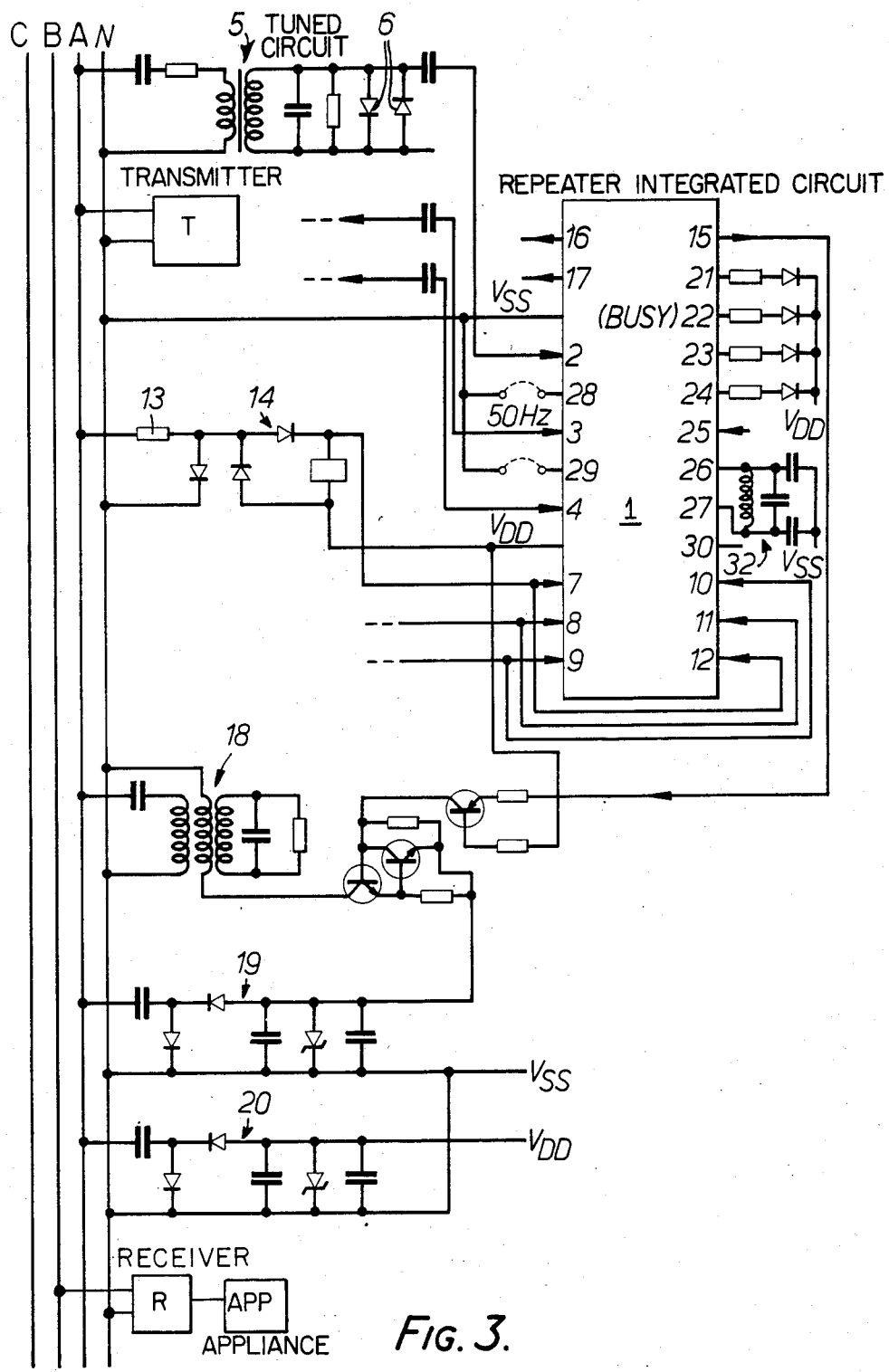
FIG. 3 is a circuit diagram showing one use of a repeater circuit.

FIG. 3 shows an MOS integrated circuit 1 which is a repeater circuit connected, in this example, in such a way as to provide a 4-wire repeater system connected to receiver signals from a transmitter T, and to supply signals to a receiver R and appliance App, all as described in U.K. Pat. No. 1,592,971. Inputs 2, 3 and 4 are coupled to the phases A, B and C by tuned circuits, tuned to 120 KHz, and one of which is shown at 5. Diodes 6 in the secondaries protect the inputs from excess voltage.

Mains trigger inputs 7, 8 and 9 are also coupled to the input phases; additional mains trigger inputs 10, 11 and 12 are provided for the output main and in this 4-wire system the two sets of trigger inputs are coupled together as the system is intended to repeat onto the same main. These inputs are coupled to the main by respective resistors 13 to detect the phase waveforms. Diode limiters 14 protect each mains trigger input.

The integrated circuit has three outputs 15, 16 and 17 coupled to respective phases by step down transformers 18 driven by transistors supplied with power by a capacitative dropper power supply 19. A second such supply 20 supplies the integrated circuit itself.

Figure 4:
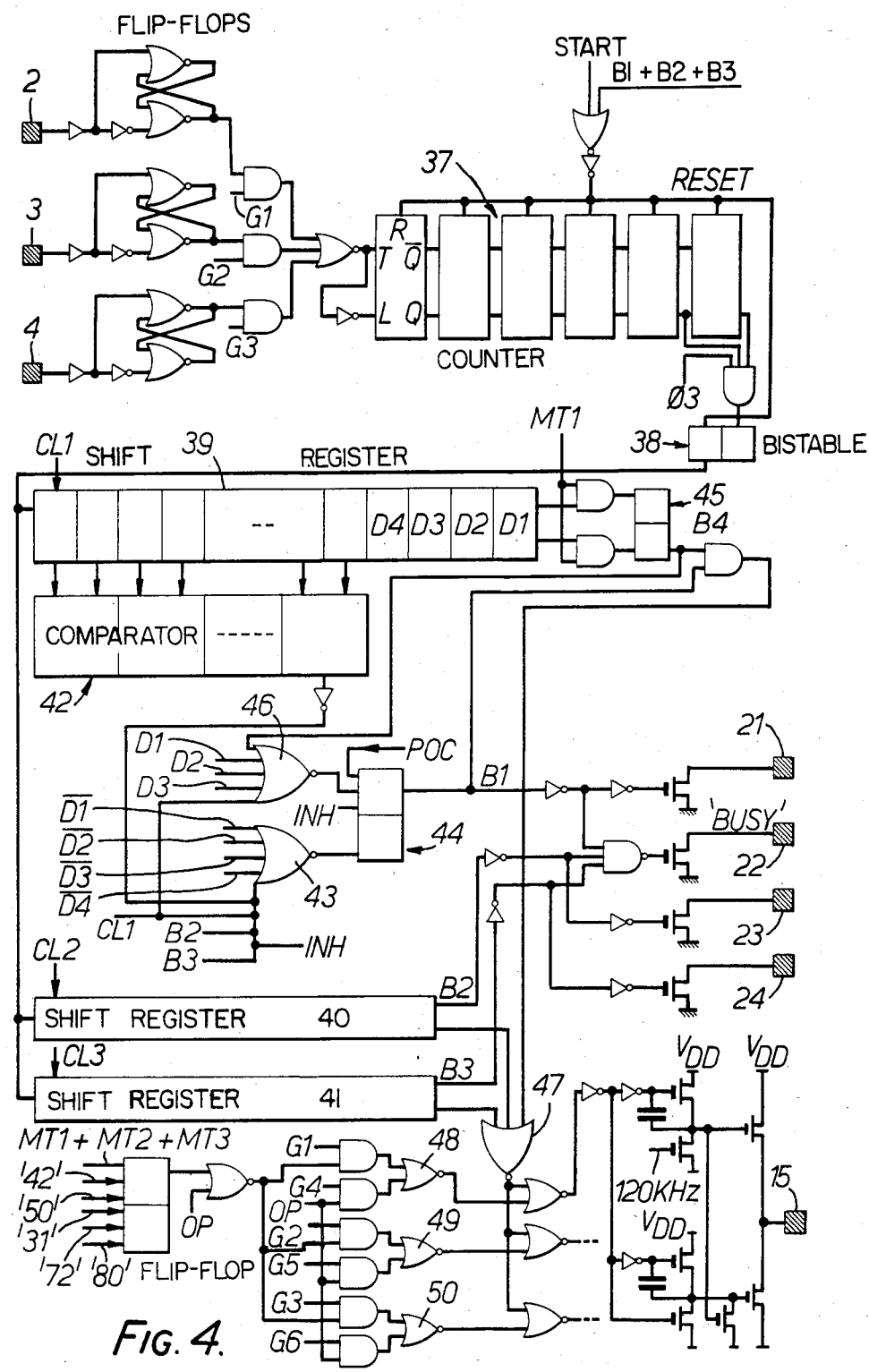
FIG. 4 is a block diagram of the repeater circuit.

FIGS. 4 to 6 show details of the integrated circuit itself, FIG. 4 showing the main signal path from inputs 2, 3 and 4 to outputs 15, 16 and 17 (only output 15 is shown for simplicity). FIGS. 5 and 6 show basic control circuitry.

The circuitry is MOS four-phase logic circuitry controlled by two clock signals $\phi 1$ and $\phi 3$ (the two further "phases" $\phi 2$ and $\phi 4$ are implied in that they are represented by the gaps between the pulses $\phi 1$ and $\phi 3$). These signals $\phi 1$ and $\phi 3$ are generated by the circuit of FIG. 5b comprising a ring oscillator 31 using an external tuned circuit 32 and three inverters. The resulting pulses (at 240 KHz) are fed by three inverters to a first of three divide-by-two circuits to deliver the signal "120 KHz". This signal "120 KHz" goes to the two further divide-by-two circuits the outputs of which are so gated by two NOR gates as to provide two sets of pulses at 30 KHz, one being $\phi 1$ and the other $\phi 3$, of equal pulse widths and with a mark/space ratio of 3:1.

These pulses are used to steer the logic of the repeater as exemplified in FIG. 5a which illustrates one of six circuits connected to trigger outputs 7 to 12 to produce zero-crossing detection signals MT1 to MT6 occurring just after the zero crossings and synchronized with the timing signals φ1 and φ3. When the first φ1 pulse occurs after the polarity of the mains reverses, this reversal is passed by two AND gates to a first flip-flop which thus changes state. A short time after, this change of state is gated by φ3 and two further AND gates to a second flip-flop which then changes state. The states of the two flip-flops are monitored by two AND gates and a NOR gate to produce a pulse MT1 lasting from when the first flip-flop change on φ1 until the second changes on the next φ3.

FIG. 5c shows two inverters used to produce from a signal at the input 28 two signals of opposite logic states, i.e. signals "50" and "60" defining one or other of 50 KHz and 60 KHz operation.

A similar circuit in FIG. 5d generates an option signal "OP" from input 29 and its function will be described hereinafter.

FIG. 5e shows a flip-flop 34 to generate an inhibit signal "INH" from an input 25.

FIG. 5f shows a circuit for generating a power-on-detect signal POC (which may be inhibited for test purposes by a signal applied to an input 30). Signal POC is used to initialize elements in the repeater on powering up. The signal POC is synchronized with MT1 and φ1 by a NAND gate and an MOS switch which cause capacitor 33 to charge up to change the state of a flip-flop a certain time after the first application of power.

Figure 6A:
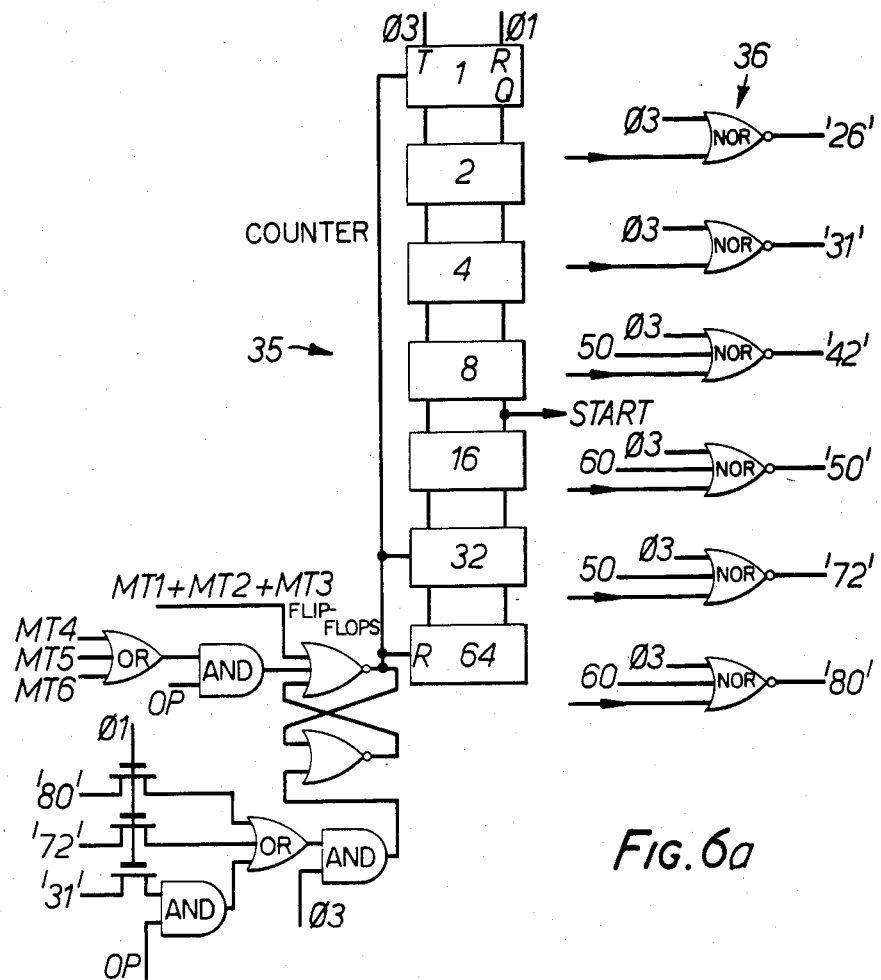
Figure 6B:
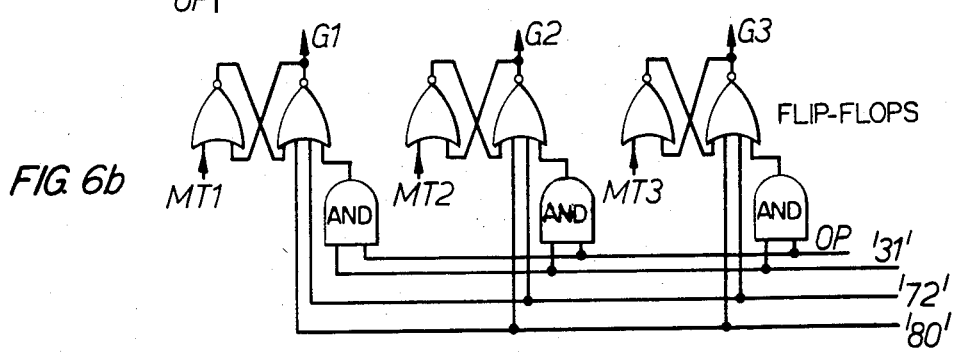
Figure 6C:
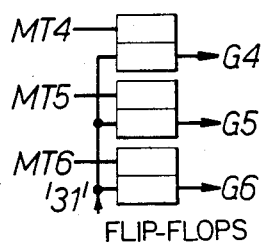
Figure 6D:
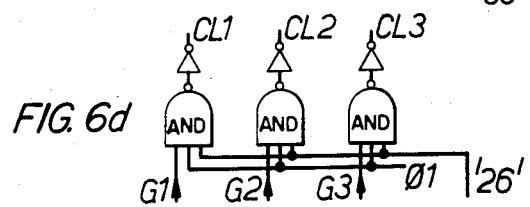

Referring to FIG. 6a, this shows a seven-stage counter 35 coupled to receive the timing signals φ1 and φ3 to be counted up thereby. The counter is reset from a flip-flop by any of the triggers MT4 to MT6, when the option signal "OP" is high, or by any one of triggers MT1 to MT3. The flip-flop is changed over to enable resetting to recur by an AND gate at φ3 time. AND gate is operated by a signal "80" or by a signal "72" or by a signal "31" in combination with signal OP, all at φ1 time. Signals "80", "72" and "31" are signals produced at those particular counts of the counter 35, as will now be described. Firstly, a signal "START" is produced by the counter 35 whenever the counter has reached a count of 8 (266 u seconds after commencement of counting, i.e. after the occurrence of a zero-crossing). Other count signals are obtained from the counter at φ3 time by a set of NOR gates 36. It is to be noted that some of these gates also receive the "50" and "60" signals from FIG. 5c. The counter decoding values, their times after a zero-crossing and their functions are as follows:

8: 266 u secs. open receive window;
26: 866 u secs. close receive window;
31: 1.0 m. secs. reset first transmit pulse;
42: 1.38 m. secs. start of second transmit pulse (60 Hz);
50: 1.66 m. secs. start of second transmit pulse (50 Hz);
72: 2.40 m. secs. end of second transmit pulse (60 Hz);
80: 2.66 m. secs. end of second transmit pulse (50 Hz);

FIG. 6b shows a circuit for generating three input gating signals G1, G2 and G3 for the three input phases of the main. Each is produced by a flip-flop (FIG. 6b) to commence on the occurrence of its associated input main zero-crossing (MT1, 2 or 3) and or stop when count signal "72" to "80" is produced (or when count signal "31" is produced and the option signal "OP" is high). Gating signals G4 to G6 for the three output phases are generated by three flip-flops from MT4 to MT6 and terminate when count signal "31" is produced (FIG. 6c).

Clocking signals CL1 to CL3 are produced by NAND gates (FIG. 6d) so as to occur at φ1 time when count signal "26" has occurred (end of receive window) during the high state of gating signals G1 to G3, respectively.

Returning now to FIG. 4, the 120 KHz cycles received from the three phases of the main and extracted by tuned circuits 5 (FIG. 3) are shaped by respective flip-flops and gated by the gating signals G1 to G3, respectively, through AND gates to a NOR gate and then into a counter 37. G1 to G3 are mutually exclusive in view of their timing relative to MT1 to MT3 so only the cycle or pulses from one phse are counted at any one time. The counter has a RESET line which receives the START signal (count of 8) to reset it. Assuming 60 Hz operation and that phase A is just going through zero, then MT1 is generated, which generated G1 to cause the input cycle at about 120 KHz at input 2 to be passed to the counter. About 266 u seconds later, "START" is generated to reset the counter whereupon counting of the cycles commences for a "receive window" or time slot identical to that used by the receivers R. A bistable circuit 38 is coupled to the counter 37 by an AND gate to detect a count of 48 pulses. When that count is reached, the bistable (initially reset by "START") changes state. Thus, circuit 38 follows the bit pattern of the received data on all three phases in turn. Shift registers 39, 40 and 41 read circuit 38 in turn on being clocked by their clock signals CL1, CL2 and CL3, respectively, i.e. at count "26" which thus defines the end of the receive window for the phase concerned. When a bit has been read from phase A, MT2 occurs to repeat the operation for phase B, and so on.

Register 39 relates to phase A, 40 relates to phase B, and 41 to phase C (40 and 41 are shown diagrammatically). As previously described, a complete message lasts for 11 cycles of the AC line, and consists of a "start code" followed by the 9-bit command or address code. Data appearing at bistable circuit 38 at the ends of the receive windows is clocked into the registers 39, 40 and 41 in turn. These registers are 22 bits long, so after 22 half cycles of the AC line from the receipt of the first bit of the signal, the "start code" occupies bits 19 to 22 of the register and the command or address code occupies bits 1 to 18.

Three comparators (denoted 42 for register 39) check that the code stored in each register at bits 1 to 18 is in the correct format, i.e. the second bit of each pair should be the inverse of the first bit. Gate 43 looks for the correct combination for the "start code" stored in bits 19 to 22 and the correct format in bits 1 to 18, and if found sets bistable circuit 44 to generate signal B1 (B2 and B3 for the other registers). Whichever of B1, B2 and B3 occurs first, that one reaches NOR gate 47 to allow data to be clocked from the associated register 39, 40 or 41 onto all three outputs 15, 16 and 17 through D-type bistable circuits 45 (only that for register 39 is shown).

These bistable circuits 45 are clocked by MT1, MT2 and MT3, respectively, and hold the output data valid for ¼ cycle of the input phases. If signal B1 is set, it inhibits corresponding signals B2 and B3 for the other phases (by their gates 43) and so prevents transmission from registers 40 and 41. Similarly, B2 and B3 inhibit transmission from the other two registers 39, 41 and 39, 40 as the case may be. The register which first receives a valid code will transmit this code onto all three repeater outputs during the following 11 mains cycles. During transmission, circuit 38 is held reset and the registers 39, 40 and 41 are cleared down. Signals B1, B2 and B3 are reset by gates 46 when they detect logic "0" in bits 20, 21, 22 of the registers. This condition coincides with the end of transmission of the stored first half of the message. Signals B1, B2 and B3 are used to drive LEDs at outpus 21, 23 and 24 to provide a visible indication of which channel is repeating. The logical OR of B1, B2, B3 drives the "BUSY" output 22. This can be used to drive a single LED, as an option to the three individual LEds. The I.C. has an external inhibit at 25 to produce signal "INH" (FIG. 5a) used in FIG. 4 to allow for two-way transmission between two isolated mains systems. Data from one of the registers is passed through the gate 47 and drives the output push-pull stages operating at 120 KHZ. The duration of the 120 KHz bursts is controlled by timing signals applied from gates 48, 49 and 50. The timing signals vary according to which type of output option is selected. A second variation is according to whether 50 Hz or 60 Hz operation is required.

The output circuitry coupled to output 15 at the bottom of FIG. 4 will now be considered. At its left-hand side is a flip-flop, one side of which receives MT1 or MT2 or MT3 to define the beginning of a transmit window for the (or the first) transmit pulse. As shown in FIG. 2, there is a mode in which a second, identical, transmit pulse is issued 30° after the first for coupling with a phase 30° from the one connected to output 15. Thus, the flip-flop also receives count signal "42" (if 60 Hz is selected) or count signal "50" (if 50 Hz is selected) to define the start of that second transmit pulse. The other side of the flip-flop receives signals to stop the transmit signals, i.e. "31" to stop the (or the first) transmit signal and "72" (at 60 Hz) or "80" (50 Hz) to stop the second transmit pulse. These various "transmit windows" are passed by a NOR gate, if signal "OP" is low, to three of six ANS gates receiving gating G1 to G6, those three being the gates receiving G1, G2 and G3, the remaining gates being gated off by "OP". Thus, if "OP" is low, NOR gates 48, 49 and 50 receive six transmit windows, two for each phase and each of about 1m.sec in length. If "OP" is high, then only windows defined by G4, G5 and G6 are produced. These windows are terminated by count "31" (see FIG. 6B) when "OP" is high, i.e. the windows are again of about 1 m.sec.

There are three modes of output, selected by the option input 29 ("OP") to the logic, and also by the method of connection of the mains trigger (zero crossing detect) inputs.

The first mode is 4-wire, single pulse. The 4-wire connection is shown in FIG. 3 in which the input and output mains are the same. Option input 29 is set to logic "0" ("OP" is high) and the input and output zero crossing detectors are connected together so that MT1=MT4, MT2=MT5, MT3=MT6. The output logic "1" then consists of a single 1 m.sec pulse of 120 KHz, starting immediately after the zero crossing of each pulse with respect to neutral. This mode would be used for a normal 3-phase, 4-wire system where the 208 V type of operation is not required.

A second mode is the 4-wire, double pulse. Option input 29 is set to logic "1" ("OP" is low) and the output zero crossing detector gating signals G4 to G6 are not used by the logic. The output logic "1" consists in this case of two 1 m.sec bursts of 120 KHz on each phase (FIG. 2). The first bursts begins immediately after the zero crossing of the phase, and the second bursts begins 1.38 m.secs (30°) after the zero crossing (for 60 Hz).

This mode would be used in 3-phase, 4-wire systems where 209 V type connection is required.

The third mode is the 8-wire mode. Option input 29 is set to logic "0" ("OP" is high). Signal inputs are received from one AC system, and outputs applied to another system which is isolated from the first, i.e. MT1 to 3 are synchronous relative to MT4 to 6.

The output logic "1" consists of a single 1 m.sec burst of 120 KHz on each phase starting immediately after the output zero crossing. This mode could be used to couple signals from a 120 V/208 V system to a 277/V system as described above. The two systems must have the same frequency and they should either be in phase, or have a phase difference of at least 22 deg. The logic does not allow for the corresponding pairs of triggers to be closer than 1 m.sec.

Figure 7:
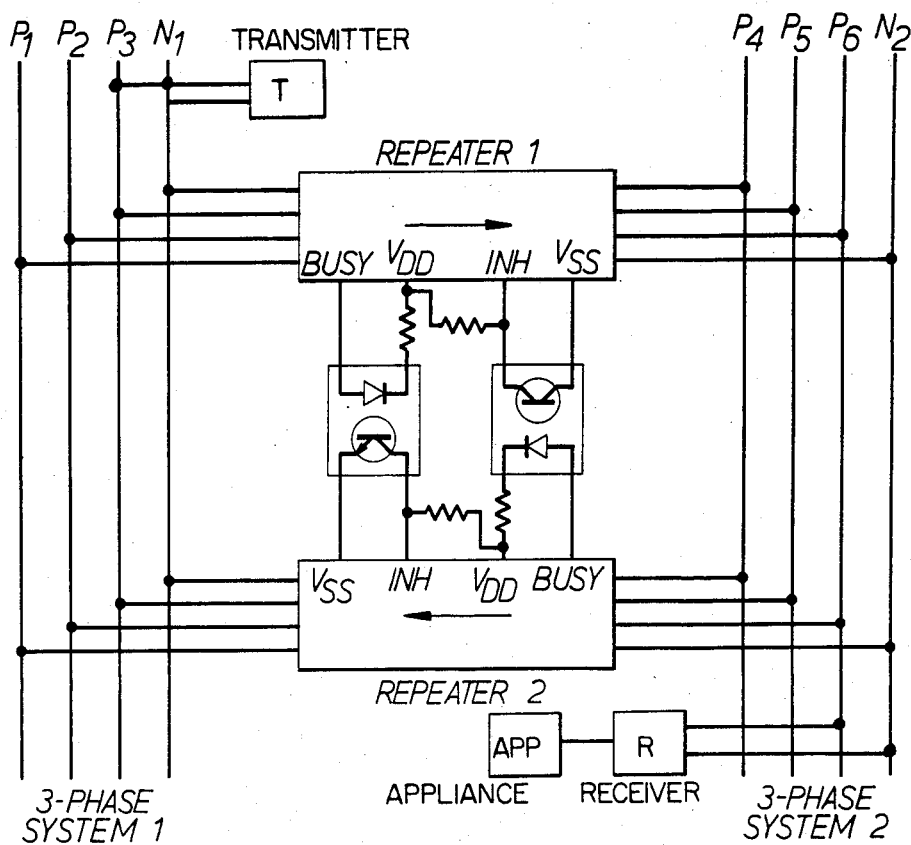
FIG. 7 is a circuit diagram showing another use of the repeater circuit.

FIG. 7 shows the repeater connections in this mode. The repeaters are connected back to back, and the "BUSY" output of each is connected to the inhibit input of the other via an opto-isolator. The inhibit function is necessary to prevent multiple repetitions of the signals between the two systems.

I claim:

1. A repeater circuit for repeating a digital control message transmitted on an electical multi-phase power main system, the message including a sequence of digital words with the words transmitted in respective time intervals spaced apart by intermediate time intervals which are at least as long as said respective time intervals, and each word conveyed by a phase of the main system having bits transmitted in synchronism with the voltage zero-crossings of that phase, said multi-phase power main system including a first section from which said words are to be received and a second section onto which said words are to be repeated, the repeater circuit comprising:
    first zero-crossing detection means electrically coupled to said first multi-phase power main section to detect the moments substantially at which the voltages on the phases of said section pass through zero;
    data input means working cooperatively with said first multi-phase power main section to receive therefrom the digital words conveyed by the phases of said section;
    storage means coupled to said data input means and controlled by said first zero-crossing means for storing the bits of a word received in said respective time intervals;
    second zero-crossing detection means electrically coupled to said second multi-phase power main section to detect the moments substantially at which the voltages on the phases of said second section pass through zero;
    time slot defining means working cooperatively with both detection means for defining, in dependence upon said moments detected by the detection means, output time slots synchronized with the phases of said second section for the transmission of the bits of said words in said intermediate time intervals; and
    output means electrically connected to the storage means for conveying the bits of a word stored in the storage means onto the phases of said second section in the defined output time slots in said intermediate time intervals.

2. A repeater as claimed in claim 1, wherein said time slot defining means comprises:

means to define input time slots synchronized with the respective phases of the first power main section, and wherein the data input means comprises:
means for counting cycles modulated on each phase of said first power main section; and
bit defining means for defining one or other of two bit values for a phase in dependence upon whether or not the counting means reaches a predetermined count in the associated input time slot.

3. A repeater as claimed in claim 2, and further comprising gating signal means for producing gating signals in dependence upon the first zero-crossing detection means to gate only one phase at a time to the data input means.

4. A repeater as claimed in claim 2, wherein the storage means comprises a register for each phase coupled to the bit defining means to receive the defined bit value.

5. A repeater as claimed in claim 4, and further comprising register clocking means for clocking each register when the associated input time slot terminates, thereby building up in each register a series of bit values corresponding to the cycle counts existing at the ends of successive input time slots of the associated phase.

6. A repeater as claimed in claim 1, wherein the time slot defining means comprises:
a clock generator for generating a clocking pulse train at a frequency which is high in comparison with the frequency of the power main system;
a counter coupled to the zero-crossing detection means to count said clocking pulse train from said moments detected by the zero-crossing detection means; and
means for detecting predetermined counts of said counter to define the ends of time slots.

7. A repeater as claimed in claim 6, operable with a system in which the first and second power main sections are of the same power main, and further comprising an input for receiving a signal to prevent the second zero-crossing detection means from acting upon said counter.

8. A repeater as claimed in Claim 1, wherein the time slot defining means comprises:
means for defining input time slots synchronized with the main by the first zero-crossing detection means for the input of data to the storage means; the repeater further comprising:
an input for supplying to the repeater a command signal; and
control means for controlling the time slot defining means in dependence upon the command signal such that, with one state of the command signal, the output time slots are defined by said first zero-crossing detection means and, with another state of the command signal, the output time slots are defined by said second zero-crossing detection means.

9. A repeater as claimed in claim 1 wherein the time slot defining means comprises:
means for defining two separate time slots for each bit, whereby each bit is transmitted twice; and
means for defining the separation of said time slots such that the second transmission of a bit occurs substantially 30° after the first transmission of the bit at a given power main frequency.

10. A repeater according to claim 9, for use at two alternative predetermined power main frequencies, the repeater comprising:
an input to receive a selection signal to select either one of said frequencies,
counting means for counting at a fixed frequency, and
selection means operable in dependence upon the selection signal to select one of two predetermined counts corresponding to a 30° phase shift at the selected one of said predetermined power main frequencies.

* * * * *